Aug. 18, 1931.  J. C. BOYTON  1,819,985
SERVICE ENTRANCE
Filed Aug. 22, 1929
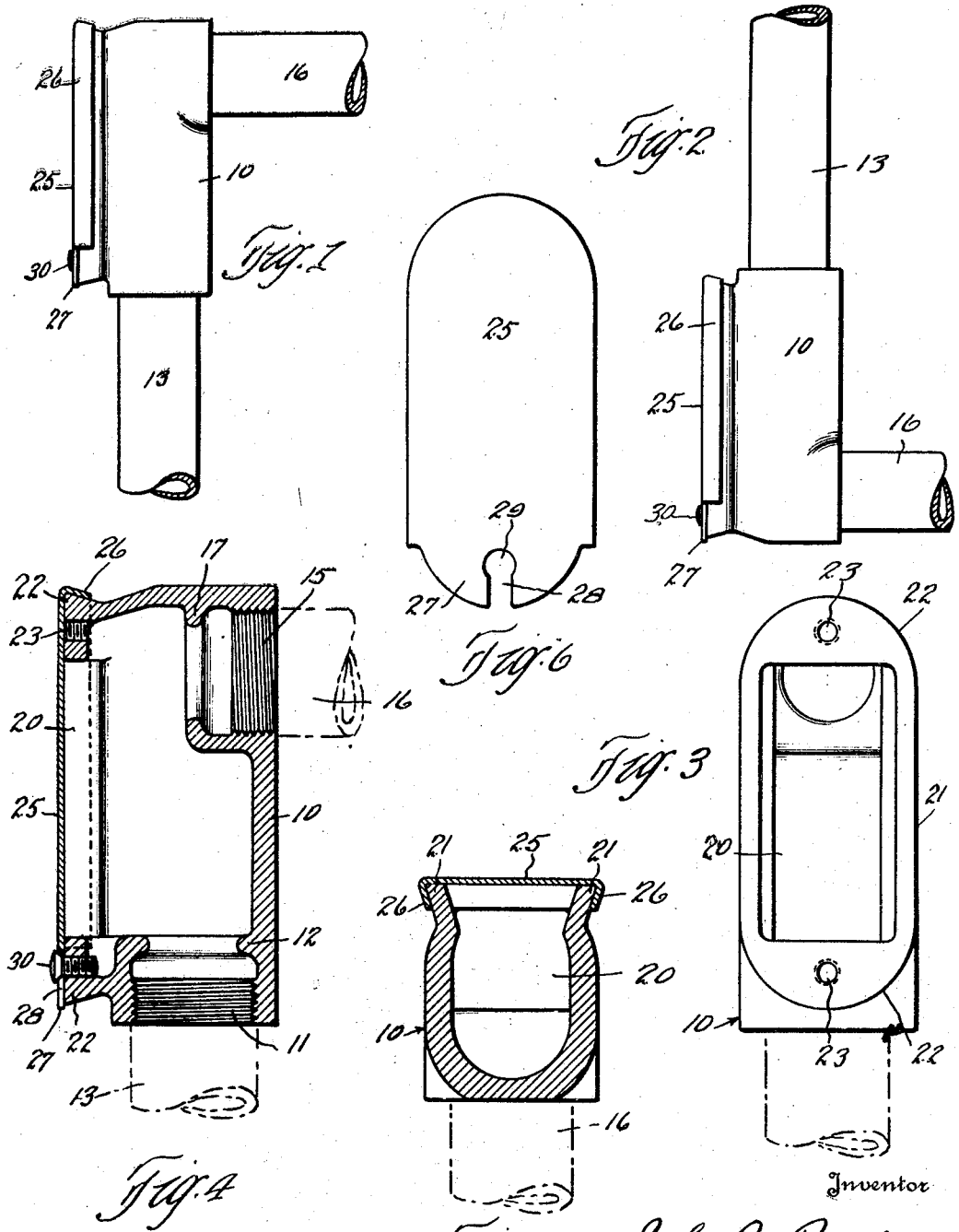

Patented Aug. 18, 1931

1,819,985

UNITED STATES PATENT OFFICE

JOHN C. BOYTON, OF CLEVELAND, OHIO, ASSIGNOR TO THE ADALET MANUFACTURING COMPANY, OF CLEVELAND, OHIO, A CORPORATION OF OHIO

SERVICE ENTRANCE

Application filed August 22, 1929. Serial No. 387,570.

This invention relates to fittings for electric conduits and particularly to fittings for outside use such as service entrances.

The object of the invention is to provide a water tight fitting of the L-type which may be used in either of two positions whereby one form of fitting may take the place of two forms heretofore used.

A more specific object is to provide a fitting for electric conduits in which an opening is provided through which the wires may be pulled, and a cover which may be readily slipped into place over such opening from either of two directions so as to effectively close such opening and prevent water from entering between the closure and fitting.

In the accompanying drawings I have illustrated my invention wherein Fig. 1 is a side elevation of the fitting connecting a horizontal to vertical conduit leading upwardly thereto; Fig. 2 is a similar view showing the fitting when used in the reverse position; Fig. 3 is a front elevation of the fitting with the cover plate removed; Fig. 4 is a vertical section taken on the line 4—4 of Fig. 3; Fig. 5 is a transverse section through the fitting taken on the line 5—5 of Fig. 4; and Fig. 6 is a front elevation of the cover plate.

The fitting illustrated in the drawings comprises a hollow body member 10 provided at one end with a screw threaded opening 11 extending longitudinally of the body. Within the body member 10 at the end of the threaded opening 11 is an inwardly extending annular shoulder 12 concentric with the opening 11 which forms a stop for the conduit 13.

At the opposite end the body is provided with a second threaded opening 15 into which a conduit 16 extending at right angles to the conduit 13 may be screwed. An inwardly projecting annular shoulder 17 concentric with the opening 15 forms a stop for the conduit. Both of the shoulders 12 and 17, it will be noted, have their edges rounded so as to provide a smooth surface over which the insulated wires, which are subsequently threaded through the conduits, may be drawn without fear of cutting or scraping the insulation.

The body 10 on the side opposite the conduit opening 15 is provided with a relatively large opening 20 which extends substantially the length of the body, this opening being provided to facilitate the threading of the wires through the conduits. About the opening 20 the body portion is formed with a symmetrical outwardly flaring flange 21 rounded at the ends of the body member as at 22. At each end of the flanged portion the body is provided with threaded apertures 23 symmetrically placed relative to the rounded ends of the flange.

A cover plate 25 shaped to conform to the shape of the front of the flanged portion of the body member 10 is provided with an inwardly tapering flange 26 which extends about its two sides and one rounded end. This flange slidably engages over the dovetailed flange 21 of the body member and forms a relatively tight closure for the same. The end 27 of the cover plate is flat and is provided with a slot 28 enlarged slightly at its inner end, which enlarged opening 29 is arranged to register with one of the threaded apertures 23 in the body when the cover plate is slid in place over the flange 21 from either end of the body member. A screw 30 which fits in either of the apertures 23 is provided for securing the cover plate in place, the notch 28 permitting the plate to slide in place without entirely removing the screw, and the enlarged recess 29 receiving the tapered head of the screw when tightened.

By providing the body with the symmetrical front face and dovetailed flange 21, the fitting may be used with either end up to connect to the lead in conduit a conduit coming either from above or below the same, and the cover may be slid into place from the top whichever way the fitting is turned forming a water-tight closure for the opening.

Having thus described my invention, what I claim is:

1. An electrical conduit fitting open at one side to facilitate the threading of wires through the conduits it connects, said fitting being provided with an outwardly flaring flange about its open side and with screw holes at its opposite ends, a cover plate having an inwardly directed flange that extends only along its two sides and across one end and being provided with a notch that opens through its opposite end, the plate being adapted to be slid lengthwise over the open side of the fitting from either end thereof with its flange embracing the flange of the fitting and with said notch in register with the screw hole in the adjacent end of the fitting, and a screw adapted to occupy said hole and to be received by said notch as the cover plate is applied to the fitting and whose head is arranged to have holding engagement with said plate.

2. An electrical conduit fitting open at one side to facilitate the threading of wires through the conduits it connects, said fitting being provided with an outwardly flaring flange about its open side and with screw holes at its opposite ends, a cover plate having an inwardly directed flange that extends only along its two sides and across one end and being provided with a notch that opens through its opposite end, the plate being adapted to be slid lengthwise over the open side of the fitting from either end thereof with its flange embracing the flange of the fitting and with said notch in register with the screw hole in the adjacent end of the fitting, and a screw adapted to occupy said hole and to be received by said notch as the cover plate is applied to the fitting and whose head is arranged to have holding engagement with said plate, said notch being only slightly wider than the diameter of the screw excepting at its inner end where it is enlarged to receive the screw head.

In testimony whereof, I hereunto affix my signature.

JOHN C. BOYTON.